United States Patent Office 3,301,891
Patented Jan. 31, 1967

3,301,891
PRODUCTION OF CYCLOALIPHATIC NITRATES
Otto von Schickh, Ludwigshafen (Rhine), Germany, assignor to Badische Anilin- & Soda-Fabrik Aktiengesellschaft, Ludwigshafen (Rhine), Rhineland-Pfalz, Germany
No Drawing. Filed Feb. 15, 1957, Ser. No. 640,334
Claims priority, application Germany, Feb. 24, 1956,
B 39,247
8 Claims. (Cl. 260—466)

This invention relates to a new method of producing cycloaliphatic nitrates.

It has heretofore already been known that the nitration of cycloaliphatic alcohols can only be carried out with difficulty having regard to their ready oxidizability. Thus for example Fichter says (in translation) in Helvetica Chimica Acta, 24, 256 (1941) "A direct formation (of nitrates) from cyclohexanol and nitric-sulfuric acid (nitrating acid) is wrecked on the oxidizability of cyclohexanol."

Furthermore the proposal has been made in U.S. patent specification No. 2,396,330 to convert cycloaliphatic alcohols into the corresponding nitrates in the presence of acetic anhydride by means of highly concentrated nitric acid. This method of working has the disadvantage, however, that the acetic anhydride used as solvent reacts in part with the nitric acid and that for the purpose of separating the nitrate formed it must be diluted with water, so that a high consumption of acetic anhydride is unavoidable.

N. Kornblum and C. Teittelbaum (Am. Soc., 74, 3077 (1952)) were able to prepare cyclopentyl nitrate and cyclohexyl nitrate with extremely large amounts of nitrating acid at a temperature of $-20°$ C., but the yields thereby achieved of only about 70% of the theoretical yields were hardly satisfactory. At a temperature of $0°$ C., according to these authors, the reaction is no longer controllable and a nitrate could not be discovered among the reaction products.

Finally it is known according to the method described in Doklady Akad. Nauk S.S.S.R., volume 81 (1951), pages 1085 to 1088, to convert cyclohexane in solution in carbon tetrachloride with nitrogen pentoxide into a mixture of nitrocyclohexane and cyclohexyl nitrate. This method of operation, however, has a series of disadvantages. For one thing, the nitrogen pentoxide must be prepared by reaction of phosphorus pentoxide with 100% nitric acid in a tedious and expensive process, and furthermore working with nitrogen pentoxide is not unattended by danger (see L. B. Haines, H. Adkins, J. Am. Chem. Soc., volume 47 (1925), page 1419), and moreover the results obtainable are hardly satisfactory.

I have now found that cycloaliphatic nitrates can be prepared from cycloaliphatic alcohols without the said disadvantages by first dissolving the cycloaliphatic alcohol in an indifferent solvent and then treating it in the said solution with nitrating acid. By working in this way, not only are considerably less amounts of nitrating acid required, but yields of cycloaliphatic nitrates of between 90 and 95% of the theoretical yield are obtained. The temperature range which can be used for the nitration is also wider; it is preferable to carry out the reaction at temperatures between $+20°$ and $-40°$ C., advantageously between $-5°$ and $-10°$ C.

Cycloaliphatic or hydroaromatic alcohols which can be esterified according to this invention are for instance cyclopentanol, cyclohexanol, cyclooctanol, cyclodecalol, decahydronaphthol, the different isomers of methyl cyclohexanol and dimethylcyclohexanol and mixtures of such alcohols.

As indifferent solvents there come into question for example aliphatic halogen hydrocarbons, such as chloroform, carbon tetrachloride, ethylene chloride, or aliphatic hydrocarbons, as for example petroleum ether, hexane, heptane and so on or cyclic hydrocarbons as for example methyl cyclopentane, cyclohexane, methyl cyclohexane, dimethyl cyclohexane and so on or mixtures of the named substances.

The cycloaliphatic alcohol is dissolved in the indifferent solvent in a ratio of about 1 part alcohol to 1, 2, 3 or more parts of solvent.

The nitrating acid is a mixture of concentrated nitric acid and concentrated sulfuric acid, known in the art, whereby an amount of about 1 part of nitric acid to 1, 2, 3 or more parts of sulfuric acid may be employed.

By reason of the rapid course of the reaction, the nitration can be carried out continuously, for example by leading the two solutions destined for the reaction through a tubular coil at the desired temperature.

The nitrates obtained are valuable fuel additives especially by reason of their stability to saponifying substances, such as water or alkalies, and by reason of improving the ignition quality of diesel fuels.

The following examples will further illustrate this invention but the invention is not restricted to these examples. The parts are parts by weight.

*Example 1*

620 parts of cyclohexanol which have been dissolved in 600 parts of carbon tetrachloride are introduced as rapidly as possible while stirring into a nitrating acid mixture (1,200 parts of 70% nitric acid and 2,080 parts of 96% sulfuric acid) cooled to $-5°$ to $-10°$ C. The stirring means is then stopped and the acid (lower layer) run off. The acid is worked up by conventional methods. The organic solution (upper layer) is washed with water and soda solution until it is neutral and then fractionally distilled. After separating the solvent there are obtained 854 parts of pure water-white cyclohexanol nitrate of the boiling point $61°$ to $63°$ C. at 6 torr (mm. Hg) (equivalent to 95% of the theoretical yield with reference to the cyclohexanol introduced).

If a mixture of isomeric methylcyclohexanols be introduced instead of cyclohexanol, the isomeric methylcyclohexanol nitrates of the boiling point $70°$ to $74°$ C. at 7 torr (mm. Hg) are obtained.

By using a mixture of isomeric dimethylcyclohexanols, the corresponding dimethylcyclohexanol nitrates of the boiling point $75°$ to $81°$ C. at 7 torr (mm. Hg) are obtained.

*Example 2*

62 parts of cyclopentanol are dissolved in 150 parts of chloroform and introduced while stirring and cooling to $-5°$ to $-10°$ C. into a mixture of 100 parts of 70% nitric acid and 208 parts of 96% sulfuric acid. After the end of the reaction, the whole is poured onto crushed ice and the organic solution is separated from the aqueous solution, washed with sodium bisulfite solution to remove any cyclopentanone formed, then washed with soda solution until it is neutral and the solvent distilled off. Cyclopentanol nitrate of the boiling point $47°$ to $48°$ C. at 7 torr (mm. Hg) is thus obtained in a yield of 88 parts (equivalent to 93% of the theoretical yield with reference to cyclopentanol introduced).

If the cyclopentanol be replaced by cyclo-octanol, cyclo-octanol nitrate of the boiling point $50°$ to $54°$ C. at 0.4 torr (mm. Hg) is obtained.

*Example 3*

A solution of 130 parts of decahydro-$\beta$-naphthol in 140 parts of carbon tetrachloride is run into a mixture of 166 parts of nitric acid and 287 parts of sulfuric acid in the course of 10 minutes with agitation while cooling to 5° to 10° below zero C. Then the agitator is stopped and the organic phase separated from the acid. The organic phase is washed neutral with soda solution and water and the product left after the distillation of carbon tetrachloride is distilled. It has a boiling point of 0.4 millimeter Hg at a temperature of 85° to 87° C. There are obtained 146 parts of decahydronaphthol nitrate which comes up to 87% of the theoretical yield.

I claim:

1. A process for the production of cycloaliphatic nitrates from cycloaliphatic alcohols which comprises dissolving a cycloaliphatic alcohol in an inert solvent, mixing the resultant solution with a nitrating acid at a temperature in the range of from about −40° C. to about 20° C., agitating the mixture, and thereafter removing the solvent to recover said cycloaliphatic nitrate.

2. A process as in claim 1 wherein said cycloaliphatic alcohol is cyclopentanol and wherein cyclopentanol nitrate is recovered as the reaction product.

3. A process as in claim 1 wherein said cycloaliphatic alcohol is cyclohexanol and wherein cyclohexanol nitrate is recovered as the reaction product.

4. A process as in claim 1 wherein said cycloaliphatic alcohol is methylcyclohexanol and wherein methylcyclohexanol nitrate is recovered as the reaction product.

5. A process as in claim 1 wherein said cycloaliphatic alcohol is dimethylcyclohexanol and wherein dimethylcyclohexanol nitrate is recovered as the reaction product.

6. A process as in claim 1 wherein said cycloaliphatic alcohol is cyclooctanol and wherein cyclooctanol nitrate is recovered as the reaction product.

7. A process for the production of cycloaliphatic nitrates from cycloaliphatic alcohols which comprises dissolving a cycloaliphatic alcohol in an inert solvent, mixing the resultant solution with a nitrating acid at a temperature in the range of from about −10° C. to about −5° C., agitating the mixture, and thereafter removing the solvent to recover said cycloaliphatic nitrate, said nitrating acid consisting of one part nitric acid and at least about one part sulfuric acid.

8. A process for the production of cycloaliphatic nitrates from cycloaliphatic alcohols which comprises dissolving a cycloaliphatic alcohol in an inert solvent, mixing the resultant solution with a nitrating acid at a temperature in the range of from about −10° C. to about −5° C., agitating the mixture, and thereafter removing the solvent to recover said cycloaliphatic nitrate, said nitrating acid consisting of one part nitric acid and at least about one part sulfuric acid.

References Cited by the Examiner

UNITED STATES PATENTS

| 1,973,559 | 9/1934 | Brown | 260—467 |
| 2,435,314 | 2/1948 | Kokatnur | 260—467 |
| 2,437,582 | 3/1948 | Wyler | 260—467 |

OTHER REFERENCES

Fichter: "Helvetica Chimica Acta," 24, 256 (1941).
Kornblum et al.: "Jour. Am. Chem. Soc.," 74, 3077 (1952).

BENJAMIN R. PADGETT, *Primary Examiner.*

LEON D. ROSDOL, ROGER L. CAMPBELL,
*Examiners.*

W. I. ANDRESS, J. W. WHISLER, L. A. SEBASTIAN,
*Assistant Examiners.*